(12) United States Patent
Deetjen

(10) Patent No.: US 8,052,221 B2
(45) Date of Patent: Nov. 8, 2011

(54) TRACTOR

(76) Inventor: James E. Deetjen, Schaumburg, IL (US)

( * ) Notice: Subject to any disclaimer, the term of this patent is extended or adjusted under 35 U.S.C. 154(b) by 116 days.

(21) Appl. No.: 12/697,932

(22) Filed: Feb. 1, 2010

(65) Prior Publication Data

US 2010/0194174 A1    Aug. 5, 2010

Related U.S. Application Data

(60) Provisional application No. 61/148,686, filed on Jan. 30, 2009.

(51) Int. Cl.
*B60P 1/00*    (2006.01)

(52) U.S. Cl. ...................................... 298/1 C; 298/23 M

(58) Field of Classification Search .................. 298/1 C, 298/17 R, 22 R, 22 P, 22 C, 23 M; 280/124.11, 280/124.112; 180/24.06, 24.07, 212, 242
See application file for complete search history.

(56) References Cited

U.S. PATENT DOCUMENTS 6,955,404 B1 * 10/2005 Best et al. ..................... 298/1 C

* cited by examiner

*Primary Examiner* — Stephen Gordon
(74) *Attorney, Agent, or Firm* — Pauley Petersen & Erickson

(57) ABSTRACT

A tractor for hauling concrete and similar materials at a construction site. The tractor includes an engine powering two pumps connected in series. The two pumps providing hydraulic pressure to: independently power each of a plurality of wheels; to rotate at least one of the wheels to provide steering to the tractor; to raise and lower a bucket; and to release and close a latch for a gate connected to the bucket.

20 Claims, 6 Drawing Sheets

TRACTOR

CROSS REFERENCE TO RELATED APPLICATION

This application claims the benefit of U.S. Provisional Application No. 61/148,686, filed on 30 Jan. 2009. This Provisional Application is hereby incorporated by reference herein in its entirety and is made a part hereof, including but not limited to those portions which specifically appear hereinafter.

BACKGROUND OF THE INVENTION

1. Field of the Invention

This invention relates generally to a tractor for hauling materials or cargo, including concrete, at a construction site and, more particularly, to a tractor utilizing hydraulics.

2. Discussion of Related Art

Various tractors for hauling cargo at a construction site are known. For example the Scoot-Crete® power buggy is a device designed for hauling concrete at construction sites. The Scoot-Crete® power buggy is a two-wheel drive cart with a bucket. These carts support the cargo over the two drive wheels but, because the cargo is often very heavy, these carts can sink into soft ground and bottom out on the frame of the cart. Such characteristics may cause the drive wheels to lose traction and spin in the soft ground.

SUMMARY OF THE INVENTION

The present invention is directed to a tractor for hauling concrete and other materials including, but not limited to, soil, gravel and sand, at a construction site. In a preferred embodiment, the tractor includes a frame, an engine, a hydraulic system, a plurality of independently powered wheels, a bucket and a gate. In one embodiment, the tractor rests on three wheels connected to the frame. Two of the wheels are preferably positioned in a front of the tractor under the bucket and a third wheel is preferably positioned in a rear of the tractor under a seat for an operator.

The hydraulic system includes a drive subsystem, a steering subsystem and/or a bucket subsystem. Power for the hydraulic system is preferably supplied by an engine connected to two pumps in series, a drive pump and an auxiliary pump. Controls for the drive subsystem, the steering subsystem and the bucket subsystem can include, but are not limited to, a steering wheel, a joystick, an accelerator pedal and/or a brake pedal.

According to a preferred embodiment of the invention, the drive pump provides pressure for the drive subsystem. The drive subsystem includes a plurality of wheel motors fluidly connected to the drive pump, each of the wheel motors rotationally connected to a respective wheel. This design provides independent power to each of the wheels which reduces the possibility of the tractor getting stuck in the rough/loose/wet terrain of a construction site. The drive subsystem may also include a plurality of brakes, each brake connected to a respective wheel. The plurality of brakes can be incorporated into the plurality of wheel motors or may be separate units.

The auxiliary pump preferably provides hydraulic pressure to the steering subsystem and/or the bucket subsystem. In one embodiment, the steering subsystem operates to rotate the rear wheel under the seat of the operator. The steering subsystem includes a steering hydraulic cylinder with rack and pinion steering. This arrangement provides a turning radius that is up to three times smaller than prior art powered carts.

The bucket subsystem operates to pivot the bucket from a load position to an unload position. In one embodiment, the bucket subsystem includes a bucket tilt hydraulic cylinder and/or at least one gate latch hydraulic cylinder. The bucket tilt hydraulic cylinder is positioned between the frame and the bucket. The gate latch hydraulic cylinder operates to move a latch from an open to a closed position. The bucket is hingely connected to the frame to pivot at a front of the tractor and over the front wheels. The gate is hingely connected to the bucket to pivot at a top corner of the bucket. Pressurizing the bucket cylinder lifts a rear of the bucket causing the bucket to pivot at the front of the tractor. Activating the gate latch hydraulic cylinder moves the gate latch, releasing the gate to the open position. Gravity acting on the contents of the inclined bucket and the unlatched gate allows the contents of the bucket to be deposited in a desired location. The opening between the gate and the bucket is preferably positioned near a bottom of the tractor, this position minimizes splashing of the concrete as it is unloaded.

BRIEF DESCRIPTION OF THE DRAWINGS

These and other objects and features of this invention will be better understood from the following detailed description taken in conjunction with the drawings, wherein.

DESCRIPTION OF PREFERRED EMBODIMENTS

Figure 1:
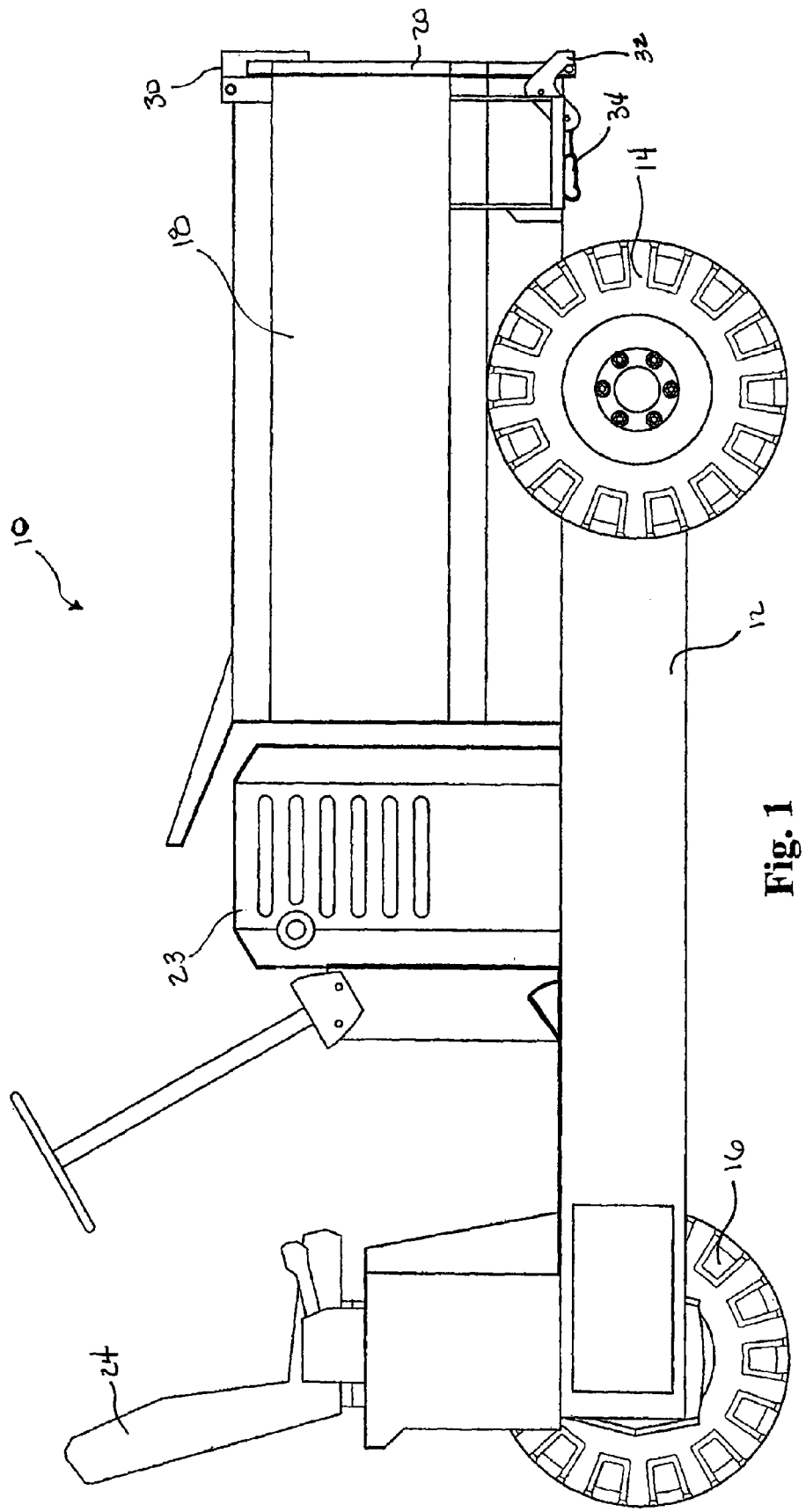
FIG. 1 is a side view of a tractor in a load position according to one embodiment of this invention.
Figure 2:
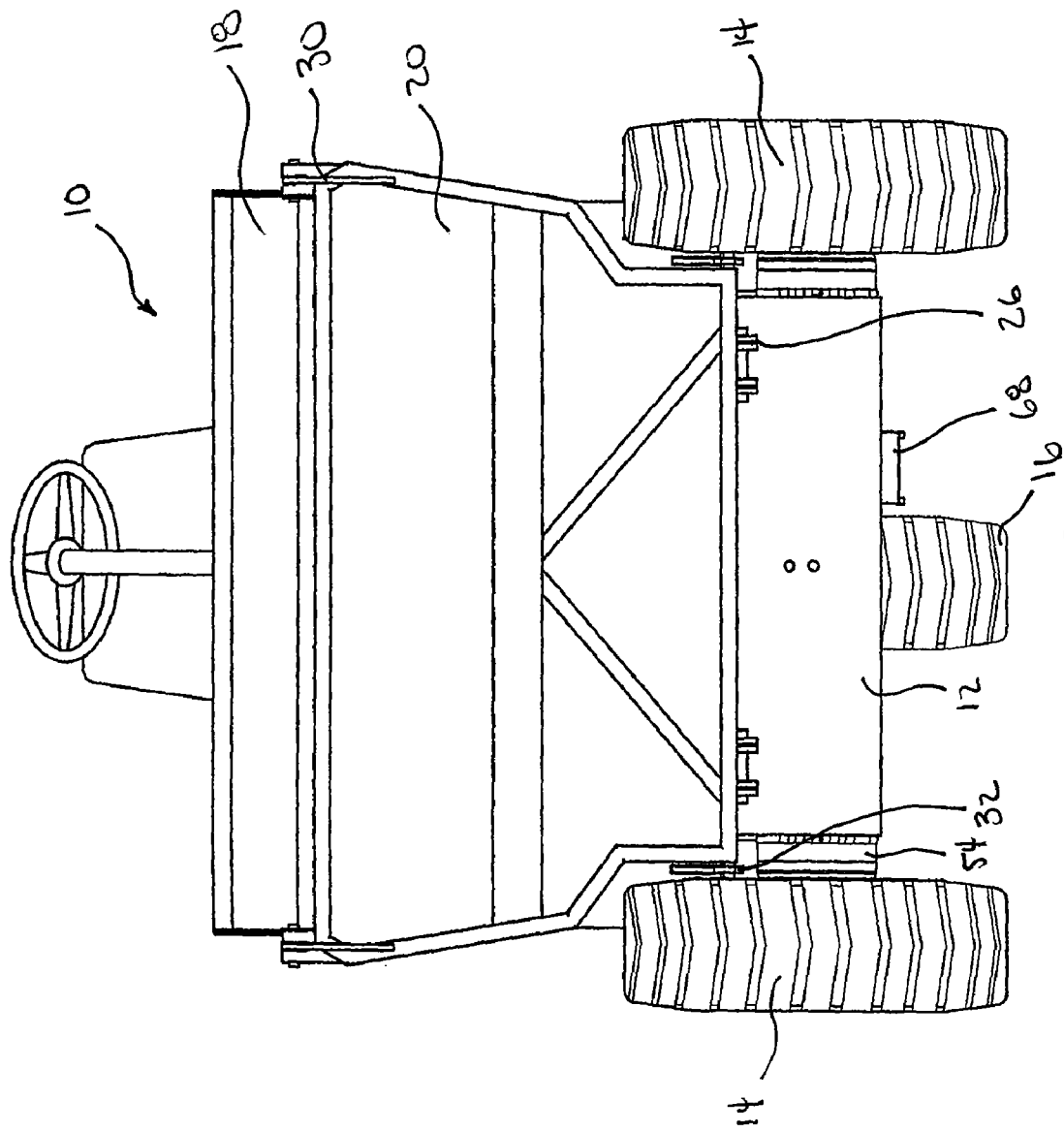
FIG. 2 is a front view of the tractor of FIG. 1.
Figure 3:
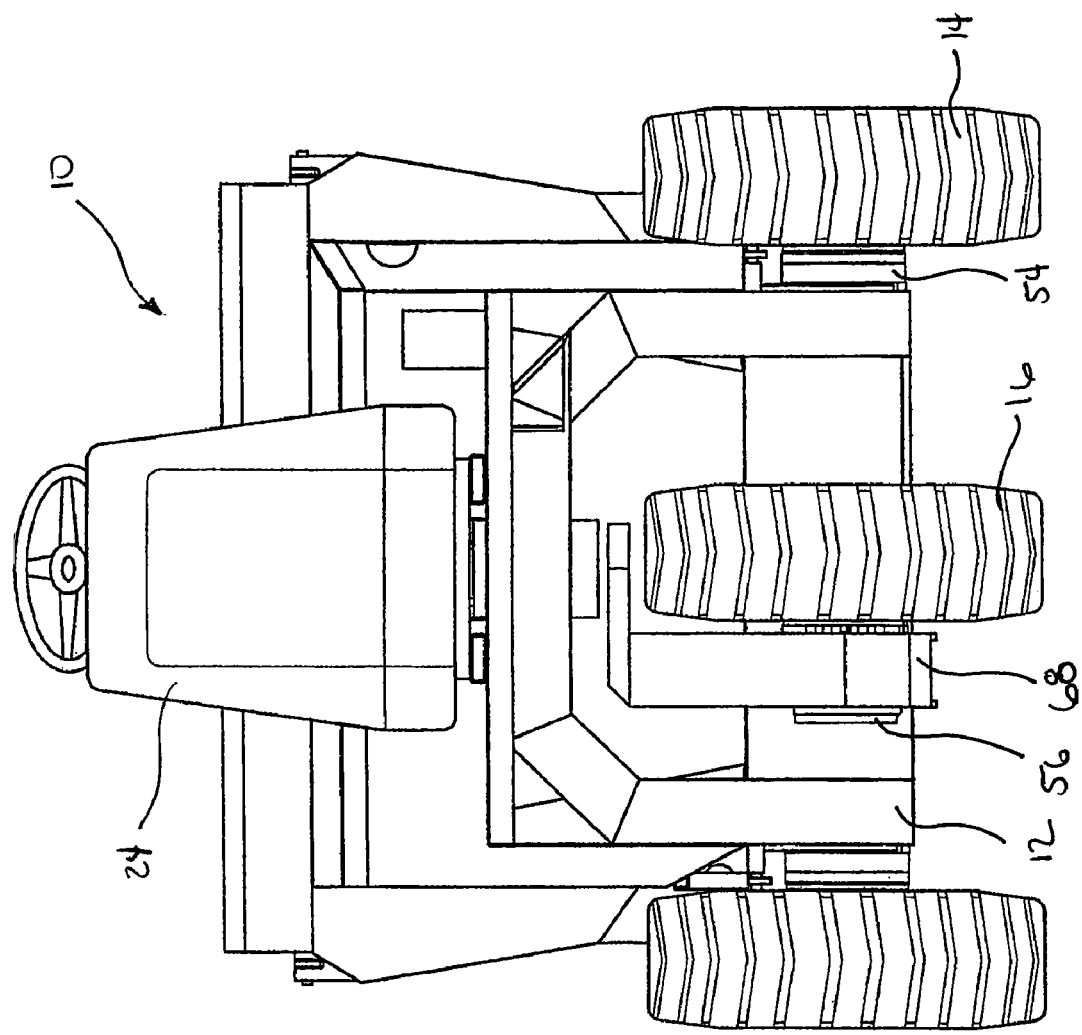
FIG. 3 is a rear view of the tractor of FIG. 1.
Figure 4:
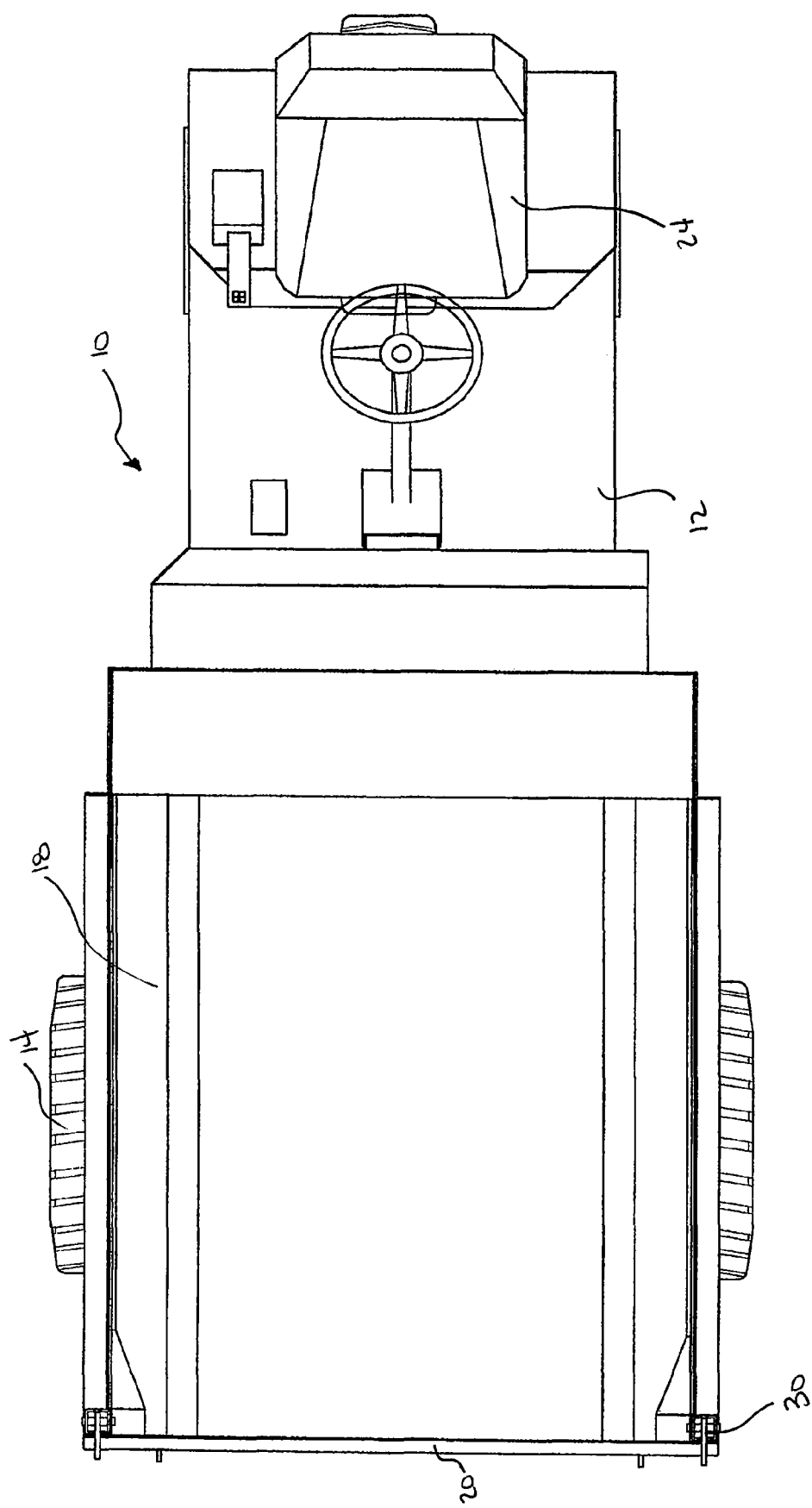
FIG. 4 is a top view of the tractor of FIG. 1.
Figure 5:
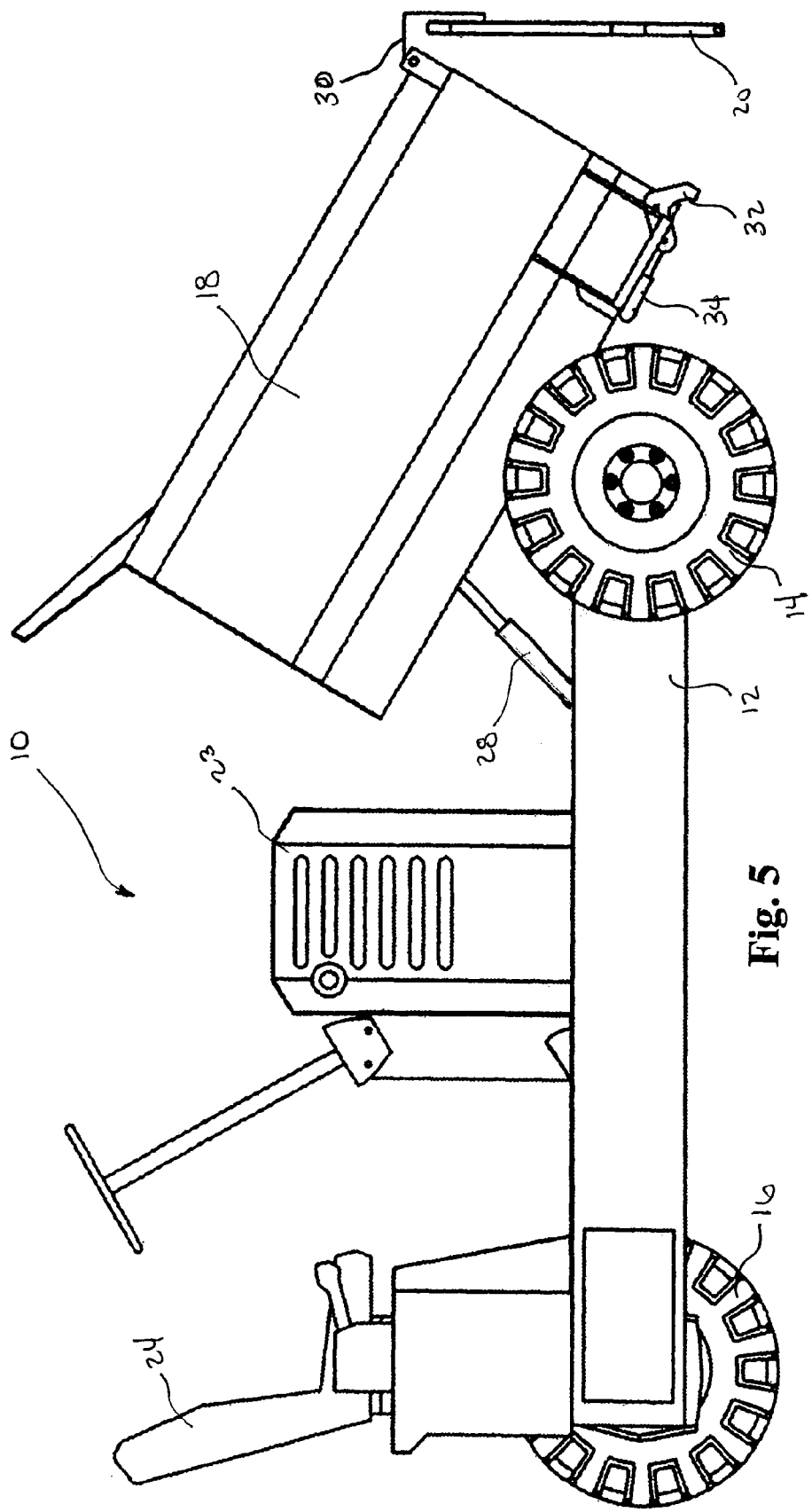
FIG. 5 is a side view of the tractor of FIG. 1 in an unload position according to one embodiment of this invention.
Figure 6:
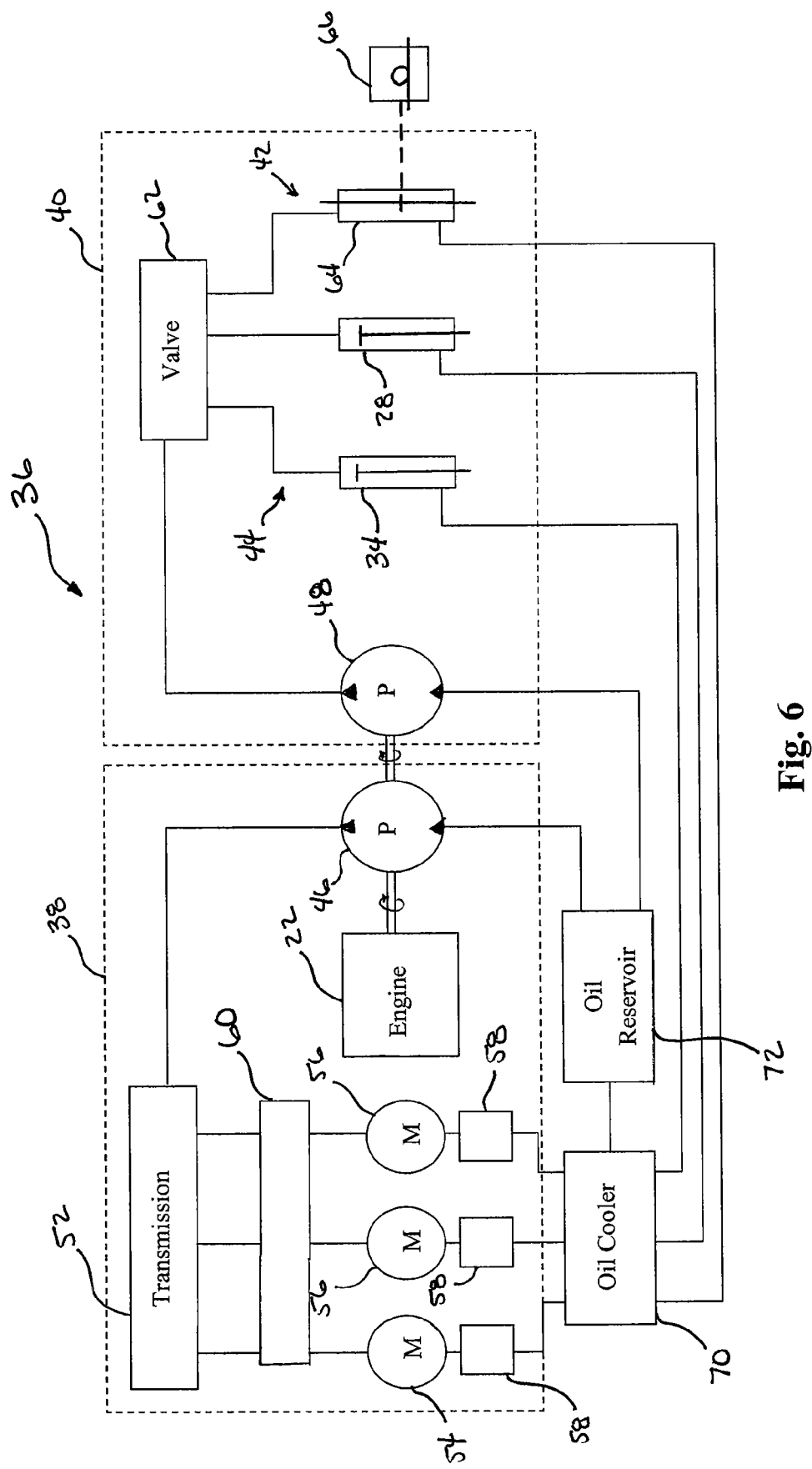
FIG. 6 is a diagram of a hydraulic system for the tractor according to one embodiment of this invention.

FIGS. 1-5 show a tractor 10 according to one embodiment of this invention. The tractor of this invention is a hydraulic powered tractor which can be used for hauling concrete and other materials at a construction site or other areas with an uneven terrain. The tractor 10 includes a frame 12, a front wheel 14, a rear wheel 16, a bucket 18, a gate 20, and an engine 22 (the engine 22 is shown in FIG. 6, the engine 22 is blocked from view by a engine surround 23 in FIGS. 1-5). In the embodiment of FIGS. 1-5, the tractor 10 includes three wheels, two front wheels 14 positioned beneath the bucket 18 and the rear wheel 16. In a preferred embodiment, the tractor 10 includes a seat 24 positioned above the rear wheel 16.

The frame 12, bucket 18 and gate 20 are preferably manufactured of a strong and durable material such as steel, aluminum, titanium, and/or an alloy. The frame 12, bucket 18 and gate 20 are preferably reinforced with additional supports such as ribs and/or tubing to better withstand loading, unloading and hauling of materials such as gravel, concrete, other materials and/or tools.

The bucket 18 is supported by and mounted onto the frame 12. The bucket 18 preferably connects to a front of the frame 12 over the front wheels 14 with a bucket pivot bracket and pin 26 and to a midpoint of the frame 12 with a hydraulic bucket tilt cylinder 28. This arrangement allows the bucket 18 to pivot from a load position, shown in FIG. 1, to an unload position, shown in FIG. 5, by actuating the hydraulic bucket tilt cylinder 28. In an alternative embodiment, a plurality of hydraulic bucket tilt cylinders are positioned between the frame 16 and the bucket 18 to pivot the bucket from the load to the unload position.

The gate 20 connects to two upper corners of the bucket 18 with a pair of gate hinges 30 and hangs down to a lower edge of the bucket 18. The gate 20 can be releaseably fixed to the lower edge of the bucket 18 with at least one and preferably a plurality gate latches 32. Each of the gate latches 32 is moveable from a latched to an unlatched position by actuating a hydraulic gate latch cylinder 34. In an alternative embodiment, the gate 20 can be hinged to a lower corner of the bucket 18 and latched to an upper corner of the bucket 18 allowing the gate to pivot downwards. In another alternative embodiment, the gate 20 can be hinged to one side of the bucket 18 and latched to an other side of the bucket 18 allowing the gate to pivot about a vertical axis.

In the load position, the hydraulic bucket tilt cylinder 28 is in a retracted state allowing the bucket 18 to lie in an essentially flat position against the frame 12 of the tractor 10. With the bucket 18 in the essentially flat position, the gate 20 hangs against an open side of bucket 18. The gate 20 is secured against the open side of the bucket 18 with the hydraulic gate latch cylinder 34. To move the tractor 10 to the unload position, shown in FIG. 5, the hydraulic gate latch cylinder 34 is actuated to move the gate latch 32 and release the gate 20 from the bottom edge of bucket 18. The hydraulic bucket tilt cylinder 28 is actuated to pivot the bucket 18 to an inclined position. With the gate latch 32 open and the bucket 18 inclined, the gate 20 hangs down and away from the bottom edge of the bucket 18, allowing the contents of the bucket to be deposited on the ground. With this configuration splashing of the contents as the bucket 18 is unloaded is minimized. In a preferred embodiment of this invention, the hydraulic bucket tilt cylinder 34 and the hydraulic gate latch cylinder 34 can be activated quickly in both directions so that only a portion of the contents in the bucket 18 can be unloaded.

In the embodiment of FIGS. 1-5, the tractor 10 includes three wheels, two front wheels 14 and the rear wheel 16. Each front wheel 14 is positioned under the bucket 18 and connected to the frame by a front wheel motor 54. The rear wheel 16 is positioned under the seat 24 and connected to the frame 12 by a rear wheel motor 56 which is mounted on a yoke assembly 68 and the yoke assembly 68 is rotatably connected to the frame 12.

Power for the tractor 10 is supplied by the engine 22. The engine 22 powers a hydraulic system 36 of the tractor. In a preferred embodiment, the hydraulic system 36 is a closed-loop, high-pressure system which occupies a small footprint on the frame 12 of the tractor 10. However, the hydraulic system could be an open-loop or any other hydraulic system. The engine 22 can be any type of engine which is able to provide the power requirements of the hydraulic system 36. In a preferred embodiment, the engine 22 is a three-cylinder, four-cycle, liquid-cooled, diesel engine.

FIG. 6 is a diagram of the hydraulic system 36 according to one embodiment of this invention. The hydraulic system 36 generally comprises a drive subsystem 38 and an auxiliary subsystem 40. The auxiliary subsystem 40 further comprises a steering subsystem 42 and a bucket subsystem 44.

The engine 22 connects with a shaft to a drive pump 46 in series with an auxiliary pump 48. In a preferred embodiment, the auxiliary pump 48 is smaller than the drive pump 46 and operates at a different pressure than the drive pump 46. However, the auxiliary pump 48 may be larger than the drive pump 46 and/or may operate at the same pressure as the drive pump 46. In a preferred embodiment, the drive pump 46 is a variable-displacement axial piston pump for a closed circuit which, according to one preferred embodiment, is able to supply approximately 3,625 psi of continuous pressure. However, the drive pump 46 is not limited to a variable-displacement axial piston pump and can be any type of pump and can supply any amount of pressure. In a preferred embodiment, the auxiliary pump 48 is a gear pump which is able to provide approximately 3,500 psi of continuous pressure and approximately 4,200 psi of maximum pressure. However, the auxiliary pump 48 is not limited to a gear pump and can provide any amount of pressure needed for an application.

As shown in FIG. 6, the drive pump 46 provides pressure to the drive subsystem 38. The drive subsystem 38 includes the drive pump 46, the hydraulic front wheel motors 54, the hydraulic rear wheel motor 56, and a hydrostatic transmission 52 including a directional control valve. The drive pump 46 provides pressurized hydraulic fluid to the hydrostatic transmission 52 and the hydraulic wheel motors 54, 56. Each of the hydraulic wheel motors 54, 56 are rotationally connected to a respective wheel 14, 16 of the tractor to provide independent power to each of the plurality of wheels 14, 16. In an alternative embodiment, a single front wheel motor is connected to an axle between the front wheels 14. In a preferred embodiment, the hydraulic system 36 includes a plurality of brakes 58, each brake 58 connected to a respective wheel 14, 16. Each brake 58 can be a component of the hydraulic wheel motor 54, 56, or the brake 58 can be a separate component from the hydraulic wheel motors 54, 56.

In a preferred embodiment, each of the wheel motors 54, 56 include a twin lock system and the hydrostatic transmission 52 includes a directional control valve which has twin lock circuit compatibility. The hydrostatic transmission connects to a proportioning valve 60 which connects to each of the wheel motors 54, 56. This arrangement, improves the traction of the tractor 10 by changing a hydraulic flow and pressure to one of the wheels 54, 56 when the wheel is rotating at a higher rate than the other wheels, to prevent wheel spin.

The auxiliary pump 48 provides pressure to the auxiliary subsystem 40. The auxiliary pump 48 provides pressurized hydraulic fluid to a solenoid spool valve 62 which connects to each of the steering subsystem 42 and the bucket subsystem 44.

The steering subsystem 42 comprises a steering hydraulic cylinder 64 connected to a rack and pinion 66. The rack and pinion 66 connects to the yoke assembly 68 to provide rotational movement about a vertical axis to the rear wheel 16. In a preferred embodiment, the steering hydraulic cylinder 64 is a pass-thru cylinder, however, the steering hydraulic cylinder 64 may be any type of hydraulic cylinder.

The bucket subsystem includes the hydraulic bucket tilt cylinder 28 and at least one and preferably at least two hydraulic gate latch cylinders 34. In a preferred embodiment, the hydraulic bucket tilt cylinder 28 and/or the hydraulic gate latch cylinders 34 are electrically controlled double acting hydraulic cylinders. However, the hydraulic bucket tilt cylinder 28 and/or the hydraulic gate latch cylinders 34 can be any type of hydraulic cylinders.

After the hydraulic fluid passes through either the drive subsystem 38 or the auxiliary subsystem 40, the hydraulic fluid preferably passes through a return line to hydraulic fluid cooler 70 and into a fluid reservoir 72 to be drawn into drive pump 46 or the auxiliary pump 48. In a preferred embodiment, the hydraulic system 36 includes a plurality of return lines. In one embodiment, the hydraulic system 36 includes eight return lines.

The tractor 10 preferably includes a control system to control the hydraulic system 36. In a preferred embodiment, the control system is a Parker Hydraulics computer module, model no. IQAN-TOC2.

An operator can control the concrete tractor with multiple controls. In one embodiment, the controls include a forward-neutral-reverse switch, a control pedal, a steering wheel and/or the joystick for bucket control.

Thus, the invention provides a tractor for hauling materials, including concrete, which utilizes hydraulics to independently drive the wheels and to tilt the bucket. This invention provides a tractor which a narrower turning radius than prior art tractors and an improved means for unloading the materials.

It will be appreciated that details of the foregoing embodiments, given for purposes of illustration, are not to be construed as limiting the scope of this invention. Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention, which is defined in the following claims and all equivalents thereto. Further, it is recognized that many embodiments may be conceived that do not achieve all of the advantages of some embodiments, particularly of the preferred embodiments, yet the absence of a particular advantage shall not be construed to necessarily mean that such an embodiment is outside the scope of the present invention.

What is claimed is:

1. A tractor, comprising:
   a frame;
   a plurality of wheels connected to the frame;
   a bucket including a gate, the bucket hingely connected to the frame and the gate hingely connected to the bucket;
   an engine mounted to the frame, the engine powering a hydraulic system including a drive pump and an auxiliary pump connected in series;
   wherein the drive pump powers a drive subsystem comprising at least one hydraulic wheel motor rotationally connected to at least one of the plurality of wheels; and
   wherein the auxiliary pump powers a steering subsystem and a bucket subsystem, the steering subsystem comprising a steering hydraulic cylinder connected to at least one of the plurality of wheels and the bucket subsystem comprising a hydraulic bucket tilt cylinder connected to the bucket and a hydraulic gate latch cylinder connected to the gate.

2. The tractor of claim 1, wherein the drive pump comprises an axial piston pump.

3. The tractor of claim 1, wherein the auxiliary pump comprises a gear pump.

4. The tractor of claim 1, wherein the drive system further comprises a plurality of hydraulic wheel motors, each of the plurality of hydraulic wheel motors separately connected to one of the plurality of wheels.

5. The tractor of claim 4, wherein the tractor comprises three hydraulic wheel motors and three corresponding wheels.

6. The tractor of claim 1 further comprising a control mechanism including a steering wheel and a joystick.

7. The tractor of claim 1 further comprising a brake connected with respect to each of the plurality of wheels.

8. The tractor of claim 7, wherein the drive subsystem further comprises a proportioning valve, the proportioning valve improving traction control by applying the brake on one wheel of the plurality of the wheels when the one wheel is rotating at a higher rate than remaining wheels of the plurality of wheels.

9. The tractor of claim 1, wherein the hydraulic system is a closed loop hydraulic system.

10. The tractor of claim 1, wherein the hydraulic system further comprises a hydraulic fluid cooler.

11. The tractor of claim 1, wherein the hydraulic system further comprises a hydrostatic transmission including a directional control valve.

12. The tractor of claim 1, wherein the hydraulic system further comprises a solenoid spool valve.

13. The tractor of claim 1, wherein the auxiliary pump is smaller than the drive pump.

14. The tractor of claim 1, wherein the auxiliary pump operates at a different pressure than the drive pump.

15. The tractor of claim 1, wherein the bucket is hingely connected to the frame at a front of the tractor and the gate is hingely connected to an upper region of the bucket.

16. The tractor of claim 1, wherein the hydraulic bucket tilt cylinder comprises a double-acting hydraulic cylinder and the hydraulic gate latch cylinder comprises a double-acting hydraulic cylinder.

17. The tractor of claim 1, wherein the steering hydraulic cylinder comprises a pass-through cylinder.

18. A tractor, comprising:
   a frame including a yoke assembly rotatable about a vertical axis;
   a pair of front wheels connected to the frame;
   a rear wheel connected to the yoke assembly;
   a bucket hingely connected to a front region of the frame;
   a gate hingely connected to an upper corner of the bucket, the gate secured to a lower area of the bucket with a gate latch in a closed position;
   an engine mounted to the frame, the engine powering a hydraulic system including a drive pump and an auxiliary pump connected in series;
   wherein the drive pump provides pressurized hydraulic fluid to a hydrostatic transmission and three hydraulic wheel motors, each of the hydraulic wheel motors rotationally connected to a corresponding wheel of the pair of front wheels and the rear wheel; and
   wherein the auxiliary pump provides pressurized hydraulic fluid to a steering hydraulic cylinder connected to a rack and pinion connected to the yoke assembly.

19. The tractor of claim 18, wherein the auxiliary pump provides pressurized hydraulic fluid to a hydraulic bucket tilt cylinder positioned between the frame and the bucket.

20. The tractor of claim 18, wherein the auxiliary pump provides pressurized hydraulic fluid to a hydraulic gate latch cylinder connected to the gate latch.

* * * * *